Sept. 6, 1966 W. T. SELSTED ET AL 3,270,935

TAPE RECORDING AND REPRODUCING APPARATUS

Filed Nov. 29, 1963 2 Sheets-Sheet 1

INVENTORS
WALTER T. SELSTED
WILLIAM I. GIRDNER
BY A. C. Smith
AGENT

TAPE RECORDING AND REPRODUCING APPARATUS

Filed Nov. 29, 1963 2 Sheets-Sheet 2

INVENTORS
WALTER T. SELSTED
WILLIAM I. GIRDNER
BY A. C. Smith
AGENT

United States Patent Office 3,270,935

Patented Sept. 6, 1966

3,270,935
TAPE RECORDING AND REPRODUCING APPARATUS

Walter T. Selsted, Redwood City, and William I. Girdner, Portola Valley, Calif., assignors to Hewlett-Packard Company, Palo Alto, Calif., a corporation of California Filed Nov. 29, 1963, Ser. No. 326,811
6 Claims. (Cl. 226—188)

This invention relates to improved tape recording and reproducing apparatus which operates over a wide range of tape speeds.

It is an object of the present invention to provide tape recording and reproducing apparatus which includes improved tape guides for easy, accurate threading of the tape and which includes mechanical filtering apparatus for eliminating perturbations in the linear movement of the tape.

It is another object of the present invention to provide an improved braking system for the tape reels of tape recording and reproducing apparatus.

It is still another object of the present invention to provide capstan drive apparatus which provides a wide range of tape speeds and which accelerates the tape to high speed in a manner which obviates the need for mechanisms to take up excessive tape slack during the acceleration period.

It is a further object of the present invention to provide a reel-retaining spindle for tape recording and reproducing apparatus which facilitates easy application and removal of tape reels.

Other and incidental objects of the present invention will be apparent from a reading of this specification and an inspection of the accompanying drawing in which.

Figure 1:
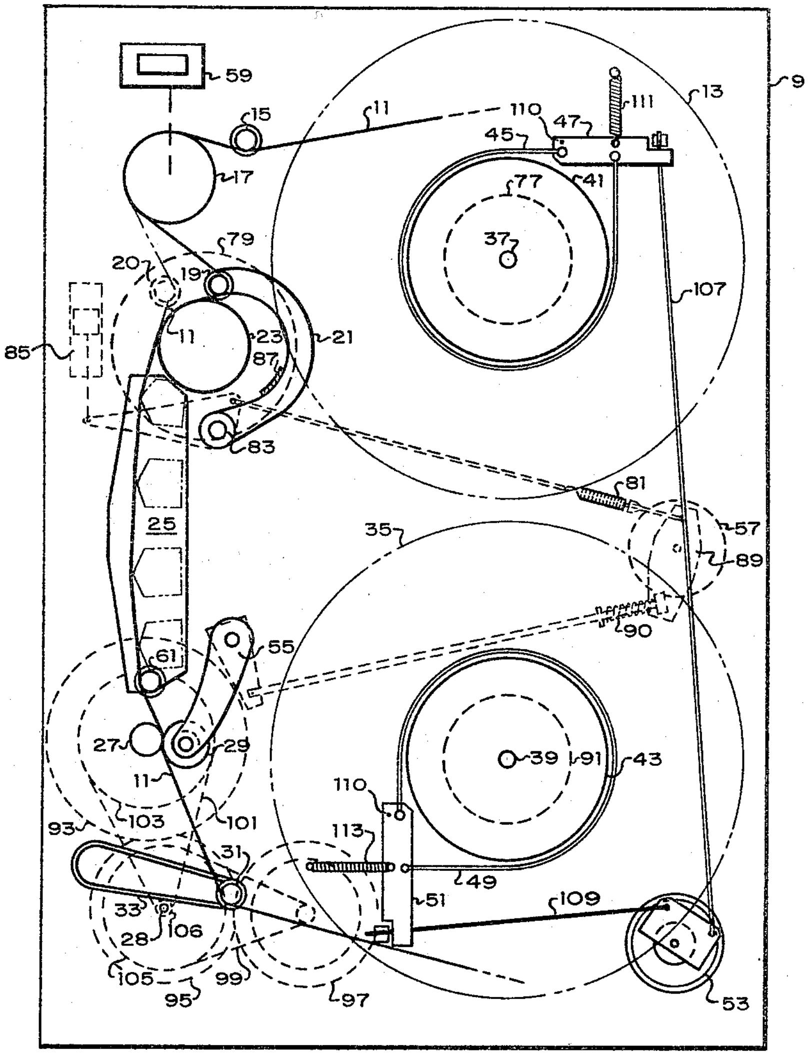
FIGURE 1 is a top view of the tape recording and reproducing apparatus showing the location of components on the base plate.

Referring now to FIGURE 1, the tape recording and reproducing apparatus is shown assembled on base plate 9. The tape 11 from supply reel 13 follows a path around guide 15, roller 17, guide 19 mounted on rotatable arm 21, the flywheel roller 23 and through the assembly of signal transducer heads 25. The tape 11 is pulled through this path by the capstan drive which includes the capstan shaft 27 and pinch roller 29. The tape 11 then follows the path around guide 31 mounted on rotatable arm 33 to the take-up reel 35. The supply reel 13 is mounted on the rotatable shaft 37 of motor 77. The brakeband 45 which has both of its ends mounted on a pivotal arm 47 is disposed around substantially the entire periphery of brakedrum 41. The pivotal arm 47 is actuated by spring 111 when the hold-off solenoid 53 is de-energized. A similar brake mechanism including brakeband 49 having its both ends mounted on pivotal arm 51 and disposed around substantially the entire periphery of brakedrum 43 is provided for take-up reel 35. This brake is actuated by spring 113 when solenoid 53 is de-energized. The pinch roller 29 mounted on rotatable arm 55 and tape guide 19 mounted on rotatable arm 21 are actuated by solenoid 57. A footage counter 59 is mechanically driven from the roller 17 and thus provides an indication of the number of feet of tape 11 passing over roller 17.

*Tape guides*

Figure 2:
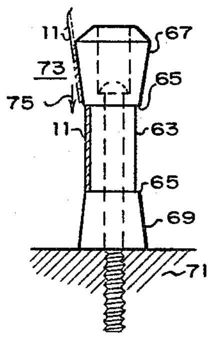
FIGURE 2 is a front view of a tape guide used in the tape recording and reproducing apparatus of the present invention.

Each of the tape guides 15, 19, 31 and optionally guide 61, have a shape similar to that shown in FIGURE 2. Each of these guides includes a first section 63 of narrow diameter having a shoulder 65 or abrupt change in diameter at the upper and lower ends of this section. The tape 11 shown in cross-section in FIGURE 2 thus slides against the section of narrow diameter 63 and is maintained in proper alignment between the upper and lower shoulders 65. Upper and lower tapered sections 67, 69 are formed as truncated cones with the truncate or smaller diameter disposed adjacent the section of narrow diameter 63. The tape guide is fastened to a supporting surface 71 to prevent rotation of the guide. Tape guides of this shape facilitate easy threading of tape through the present apparatus because they eliminate the need for critical hand alignment of the tape. If the tape becomes improperly positioned on the upper tapered section 67 of the guide as shown at 73, then a centering force 75 is exerted on the tape as the tape is pulled over the guide due to the taper of 67. Similarly, if the tape becomes improperly positioned on the lower tapered section 69, a similar centering force attributable to the tapered section urges the tape 11 into proper position on the section of narrow diameter 63.

*Mechanical filter*

Perturbations in the linear movement of the tape due to run-off of tape from a poorly packed supply reel 13 and to slight variations in torque characteristics of the motor 77 attached to the supply reel 13 as line voltage changes are minimized by the mechanical filter in the present apparatus. This filter includes the inertial movement of the supply reel 13 and the low compliance of the arm 21 which is actuated by spring 81. The guide 19 on the arm 21 maintains sufficient tension on tape 11 and provides sufficient wrap angle around roller 23 to impart driving torque to the roller 23 and the flywheel 79 attached to it. Arm 21 rotates about pivot 83 to take up and supply small amounts of tape slack as pertubations appear. The wrap angle of tape around the guide 19 on arm 21 and around roller 23 changes as arm 21 rotates. The rotational motion of arm 21 is velocity damped by the dashpot assembly 85. Linear motion of the tape 11 along the signal transducer assembly 25 is thus maintained by the capstan drive assembly 27 and pinch-roller 29, independent of perturbations in linear movement of the tape attributable to the supply of tape from reel 13. In the fast forward or rewind mode of operation, the arm 21 swings down in a counter-clockwise direction about the pivot 83 a sufficient distance to position 20 to eliminate contact between tape 11 and roller 23. At the same time, braking surface 87 on arm 21 is brought into contact with the circumference of roller 23. This brings the flywheel 79 and roller 23 to rest and holds it fixed in position during fast movement of the tape in a forward or rewind direction. This is particularly useful when changing from high tape speeds to low tape speeds following rewind over a selected portion of a recording.

*Capstan drive*

Figure 3:
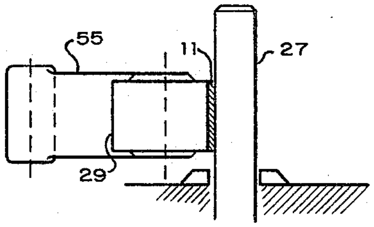
FIGURE 3 is a front view of the capstan shaft and pinch roller in operating position.

The tape speed is determined by the capstan drive mechanism of the present tape recording and reproducing apparatus. This capstan drive includes a shaft 27 which rotates at a selected angular velocity and a pinch roller 29 which urges the tape 11 against the shaft from the rear side of the tape. This pinch roller is mounted on rotatable arm 55 and is actuated by an arm 89 on the solenoid 57 through a lever arm and connecting rod. Spring 90 determines the force with which roller 29 urges the tape 11 against capstan shaft 27. The roller 29 is made not wider than tape 11 as shown in FIGURE 3 so that the only driving force for the tape is determined by the coefficient of friction between the surface of tape 11 and the surface of shaft 27 multiplied by the force which the roller 29 exerts against the back side of the tape 11. Conventional type pinch rollers are generally made wider than the tape so that the resilient material of which the roller is made makes contact with the surface of shaft 27. This type of pinch roller exhibits a much higher effective coefficient of friction between the tape and the capstan shaft because of the driving force exerted on the back side of the tape 11 by the roller in addition to the driving force exerted on the front side of the tape by the capstan shaft. The pinch roller of the present invention thus enables the tape to accelerate to high speeds at a rate which is determined only by the coefficient of friction between the front side of the tape 11 and capstan shaft 27. As a result, motor 91 driving the take-up reel 35 need only be capable of accelerating the reel sufficiently rapidly to take up the tape 11 as it accelerates to a speed determined by the angular velocity of capstan shaft 27. This obviates the need for complex apparatus to take up excessive tape slack following the initial engagement of a conventional pinch roller against the tape and capstan shaft.

Figure 4:
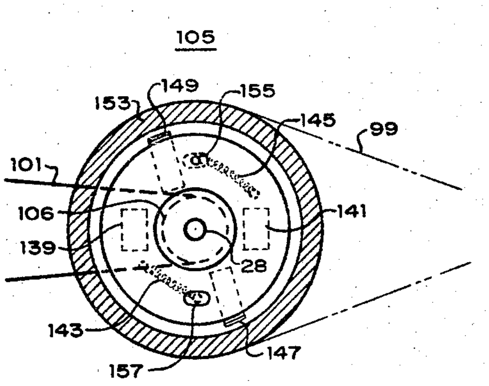
FIGURE 4 is a top view of a centrifugal clutch used in the capstan drive mechanism of the present invention.
Figure 5:
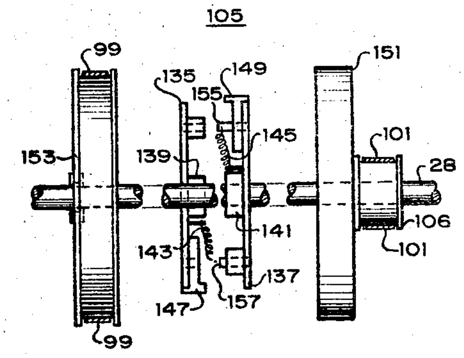
FIGURE 5 is an exploded view of the centrifugal clutch used in the capstan drive mechanism of the present invention.

The capstan shaft 27 must operate at such angular velocities as provide conventional tape speeds ranging from 1⅞ inches per second to 60 inches per second. This wide range of speeds may be provided economically by using a plurality of motors operating through speed-changing mechanisms rather than by using a single capstan motor. The speed-changing mechanism mechanically connecting the three motors 93, 95 and 97 includes belts 99 and 101 and centrifugally-actuated clutches 103 and 105 attached to motors 93 and 95 respectively. Each of these centrifugally-actuated clutches is constructed in a manner substantially as shown in FIGURES 4 and 5. This clutch includes upper and lower pivoted members 135 and 137, each including a weight 139, 141, an engaging spring 143, 145 and a friction surface 147, 149. At low angular velocities of the driven member 151 the springs 143, 145 hold the friction surfaces 147, 149 in engagement with the driver member 153. This becomes locking engagement in one rotation direction and mere sliding engagement in the opposite rotation direction because of the location of the friction surfaces 147, 149 on chords through pivots 155, 157 which are shorter than the inner diameter of driver member 153. At high angular velocities the weights 139, 141 swing outwardly against the forces of springs 143, 145, thereby carrying the friction surfaces 147, 149 mounted on pivoted member 135, 137 inwardly away from the inner surface of driver member 153. Complete disengagement of the driver and driven members 151, 153 is thus effected. Also since the weights 139 141 swing outward simultaneously, dynamic balance of the clutch assembly about shaft 28 is preserved. Inner member 151 is mounted on the shaft of a motor which has a higher angular velocity than the belt-driven outer member 153. This permits the shaft 28 to be belt-driven through the clutch assembly at lower-than-normal motor speeds and permits the shaft 28 to rotate at normal motor speeds free of the outer member 153 and the belt driving apparatus attached thereto.

*Braking apparatus*

The supply reel 13 and take-up reel 35 are each attached to brakedrums 41, 43 mounted on the shafts 37, 39 of drive motors 77, 91 associated with each of the reels, as shown in FIGURE 1. The brake mechanisms are held in the inoperative condition by the solenoid 53 through connecting linkages 107 and 109. When the solenoid 53 is de-energized, the brakes are pulled into engagement with brake drums 41, 43 by springs 111, 113. Both ends of the brake bands 45, 49 are connected to lever arms 47, 51 at different arm lengths about the pivots, thereby providing braking torques which are substantially independent of changes in the coefficient of friction between the drum surfaces and the brake bands and which are greater in one rotation direction than in the other rotation direction. This is because an increase in the coefficient of braking friction causes an increase in the force exerted on the spring through the lever arm as a result of the pull exerted on the brake band in the direction of rotation. As the spring stretches, the brake band unwraps from the brake drum, thereby compensating for the increase in braking friction. Conversely, if the braking friction decreases, less stretching force is exerted on the spring and the brake band thus wraps more tightly around the brake drum. The product of the coefficient of braking friction and the force with which the brake band is urged against the brake drum thus remains substantially constant.

The braking torque is greater in one rotation direction than in the other direction because of the dissimilar lever arms distances through which the spring exerts force on the ends of the brake bands. It can be seen that the spring force exerted on the end of brake band 45 which is pulled by counter-clockwise rotation of brake drum 41 is multiplied by the ratio of lever arm distances about the pivot 110 while the spring force exerted on the end which is pulled by clockwise rotation of the brake drum 41 is substantially the spring force itself. A similar brake mechanism including brake drum 43 and brake band 49 is provided for the take-up reel 35 and is arranged to produce the greater braking torque in a rotation direction which is opposite to that direction for which the supply reel brake mechanism produces the greater braking torque. Brakes arranged in this manner tend to enable the reel from which tape is unwinding to decelerate more rapidly than the remaining reel, thereby maintaining tension on the tape. Also brakes arranged in this manner eliminate the backlash commonly encountered in conventional brake mechanisms following reversal of the direction of braking or following initial engagement of the brake band and brake drum.

*Reel hold-down hubs*

Figure 6:
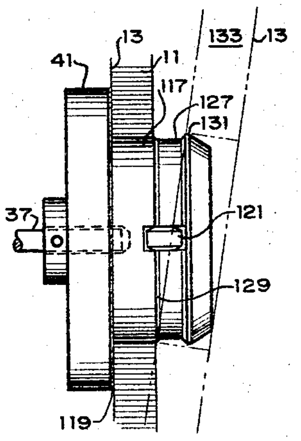
FIGURE 6 is a side view of the tape reel hold-down assembly.
Figure 7:
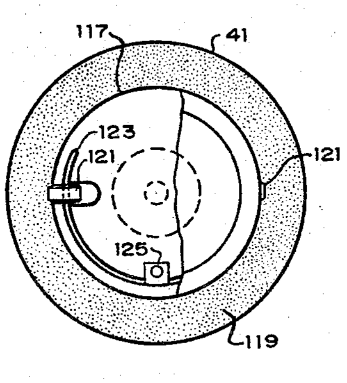
FIGURE 7 is a front view of the tape reel hold-down assembly.

The tape supply reel 13 and the take-up reel 35 are each held to the brake drum and corresponding shaft by a hold-down spindle 115 constructed substantially as shown in FIGURES 6 and 7. This hub assembly 115 includes the brakedrum 41 and is mounted on the shaft 37 of motor 77. This hub assembly holds reel 13 on surface 117 for proper axial alignment with shaft 37 and at the same time urges the reel 13 against a resilient surface 119. The reel-holding mechanism includes diametrically-opposed rollers 121 which are spring loaded by a crescent-shaped wire spring 123 held in place by clip 125. The hub assembly includes a recessed portion 127 which has a raised shoulder 129 at the inner end and which has a raised shoulder 131 at the outer end. The width of the recessed portion and the diameter of the raised shoulder 131 are so chosen that a reel 13 placed in misalignment as shown by 133 abuts against shoulder 129 and cannot be forced onto the hub or jammed thereon in misalignment. The reel 13 may thus be fitted on the hub assembly only when properly aligned therewith and held in position by the spring-actuated rollers 121. The force with which the reel is held against the resilient surface 119 is sufficient to impart the braking and driving torque from the hub assembly to the reel 13, 35.

We claim:

1. A mechanical filter for tape recording and reproducing apparatus which moves a continuous tape from a tape supply having angular inertia, the apparatus comprising:

a rotatable member having high angular inertia;

a roller attached to said rotatable member for rotation therewith;
means disposed away from said roller on the tape supply side thereof for positioning tape on said roller;
a tape guide disposed on a movable member intermediate said means and said roller;
said movable member being adapted to move along a path for altering the wrap angle of tape around said roller and said tape guide; and
means actuated by said movable member for exerting braking torque on the combined attached roller and rotatable member as said tape guide approaches a position which produces a selected wrap angle of tape about said roller.

2. A mechanical filter for tape recording and reproducing apparatus which moves a continuous tape from a tape supply having angular inertia, the apparatus comprising:
a rotatable member having high angular inertia;
a roller attached to said rotatable member for rotation therewith;
means disposed away from said roller for positioning tape on said roller;
a tape guide disposed on a movable member intermediate said means and said roller;
said movable member being adapted to move along a path for altering the wrap angle of tape around said roller and said tape guide;
resilient means to urge said movable member in a direction along said path for increasing the wrap angle of tape about said tape guide; and
means actuated by said movable member for exerting braking torque on the combined attached roller and rotatable member as said tape guide approaches a position which produces a selected wrap angle of tape about said roller.

3. A mechanical filter as in claim 2 wherein the means actuated by said movable member exerts braking torque on the combined attached roller and rotatable member as the tape guide approaches a position which produces zero wrap angle of tape about said roller.

4. A mechanical filter for tape recording and reproducing apparatus comprising:
a rotatable member having high angular inertia;
a roller attached to said rotatable member for rotation therewith;
means disposed away from said roller for positioning tape on said roller;
a tape guide disposed on a movable member intermediate said means and said roller;
said movable member being adapted to move along a path for altering the wrap angle of tape around said roller and said tape guide;
resilient means for urging said movable member along said path in a direction to increase the wrap angle of tape about said tape guide;

means attached to said movable member for velocity damping the movement thereof along said path; and
means actuated by said movable member for exerting braking torque on said roller as said tape guide approaches a position which produces a selected wrap angle of tape about said roller.

5. A mechanical filter for tape transport apparatus which moves a continuous tape from a tape supply having angular inertia, the apparatus comprising:
a rotatable member having high angular inertia;
a roller attached to said member for rotation therewith;
a capstan drive shaft and pinch roller disposed away from said roller and operating to pull tape from a tape supply along a tape path which contacts said roller;
transducer means disposed along said tape path intermediate the roller and capstan drive shaft and immediately adjacent the roller on the capstan drive shaft side thereof for operative interaction with said tape;
a tape guide movably disposed intermediate the tape supply and roller immediately adjacent the roller on the tape supply side thereof for moving along a path in skew relationship to said tape path; and
resilient means urging said tape guide along its path in a direction toward the side of the tape in contact with said roller.

6. Apparatus as in claim 5 comprising:
damping means attached to said tape guide for dissipating the kinetic energy thereof.

References Cited by the Examiner

UNITED STATES PATENTS

| | | | |
|---|---|---|---|
| 2,721,738 | 10/1955 | Kennedy | 226—61 |
| 2,827,285 | 3/1958 | Thompson | 226—195 X |
| 2,904,275 | 9/1959 | Selsted | 242—75.51 X |
| 2,916,228 | 12/1959 | Wellington | 242—76 |
| 2,950,072 | 8/1960 | Hagashida et al. | 242—76 |
| 2,964,440 | 12/1960 | Stevens | 242—75.43 X |
| 2,986,317 | 5/1961 | Mangiaracina | 226—61 |
| 3,058,686 | 10/1962 | Field | 242—68.3 |
| 3,075,716 | 1/1963 | Morgan | 242—55.12 |
| 3,092,345 | 6/1963 | Clayton et al. | 242—55.12 |
| 3,124,291 | 3/1964 | Beer | 226—178 |
| 3,124,319 | 3/1964 | Cohen et al. | 242—68.3 |
| 3,130,889 | 4/1964 | Aldridge | 226—178 |

M. HENSON WOOD, Jr., *Primary Examiner.*

MERVIN STEIN, *Examiner.*

L. CHRISTIAN, J. N. ERLICH, *Assistant Examiners.*